P. H. VAN DER WEYDE.
Apparatus for Inhaling Gases.
No. 55,398.
Patented June 5, 1866.
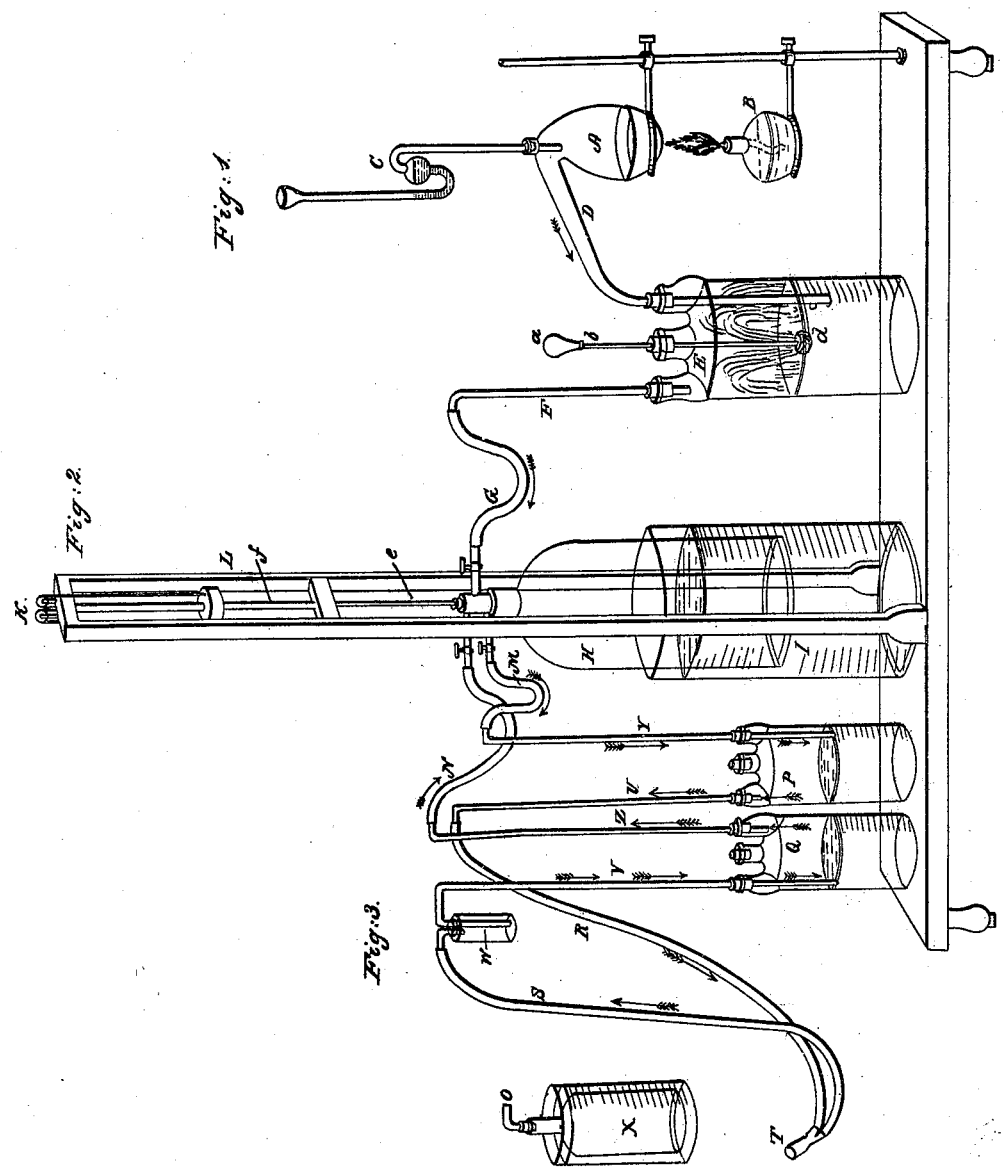

UNITED STATES PATENT OFFICE.

P. H. VANDER WEYDE, OF NEW YORK, N. Y.

IMPROVED APPARATUS FOR INHALING GASES.

Specification forming part of Letters Patent No. 55,398, dated June 5, 1866.

*To all whom it may concern:*

Be it known that I, P. H. VANDER WEYDE, of the city and county of New York, in the State of New York, have invented a new Apparatus for Generating, Preserving, and Inhaling Anæsthetic Gaseous Substances for Surgical Purposes; and I do hereby declare that the following is a full and exact description thereof.

The apparatus consists in the following distinct and separate parts, represented in the annexed diagram: I, the gas-generator and its purifier; II, the gasometer or reservoir, (a substitute for the rubber bag or bladder;) III, the purifying arrangement for the separation of the carbonic acid from the exhaled mixture of gases.

I. The retort A is filled with the substance out of which the gas is to be developed. In the case of nitrous oxide, at present the best anæsthetic known, it is filled with nitrate of ammonia, and in this case heated in a sand bath by the lamp B. The retort is provided with the common safety-tube C, filled in its bend with a little water, so that the gas has no exit there; but the air may easily enter in the retort A when it is cooling, after withdrawing the flame, in order to prevent the water from the washing-bottle E ever to ascend through the neck D into the retort A. The generated gas passes through this neck D, through the liquid in the washing-bottle E, which is filled to the proper height with water or other purifying substance. For more effective and rapid purifying a glass tube, C, passes through one of the corks in the neck of the vessel, having at its lower extremity a hollow glass ball, *d*, with holes at the upper side, and dipping just under the surface of the liquid. At its upper extremity is an india-rubber ball, *a*, attached, which, in being often squeezed by the hand, produces a number of fine water-jets, to be projected through the gas during the time it is passing through the vessel E.

II. From this purifier the gas passes through the tube F and the flexible tube G into the gasometer or reservoir H. This reservoir floats into the liquid of the lower vessel, I. This liquid may be water, but, in case of using nitrous oxide, a solution of a sulphate salt, or better, diluted sulphuric acid, as a long series of experiments has proved that nitrous-oxide gas is least absorbed by solutions of sulphates, and least of all by very diluted sulphuric acid, (one part of oil of vitriol to about ten of water.) The balancing of this gasometer H is obtained by means of the guiding-rod *e* sliding easily in the tube *f*, and at its upper end (which in the figure is invisible, being half way inside of the tube *f*) attached by means of two thin but strong ropes passing over the pulleys K to the weight or counterpoise L.

III. M and N are two flexible connections of the gasometer with the glass tubes Y and Z, and by means of those with the in and exhaling purifying-vessels P and Q, the first containing water, the latter a solution of caustic potash, soda, lime-water, or a similar alkaline substance. Both those vessels are connected by the glass tube U and V (directed upward) and the flexible tubes R and S to the mouth-piece T. The length of the glass tubes U V and Y Z is so arranged in regard to the surface of the liquid in the bottles P and Q that the inhaled gas only passes through the water. The exhaled air, however, is forced to pass through the solution of potassa, which deprives it of the carbonic acid, which is the product of all respiration. The gas is administered through a mouth-piece, T, as usual. Any variety of mouth-piece may be attached here according to the requirements of the case.

To understand the operation of this purifying arrangement, which is the most essential part of the apparatus, it must be remarked that the gas can only pass downward in the tubes V and Y, their lower ends being plunged under the surface of the liquids in the vessels P and Q. By an upward action the liquid enters those tubes for the height of two, four, or six inches, (its weight prevents usually a higher ascent.) Thus it closes those passages entirely, and acts as the most perfect valves.

The direction of the gas by passing through these parts of the apparatus during respiration is indicated by arrows.

As a precautionary means to prevent that by occasional very violent inhalation some parts of the liquid may be drawn over the bend in the top of the glass tube V, and thus enter the flexible tube S, there is a small vessel, W, attached between this glass tube V and the flexible tube S, in which the ends of the glass tubes passing through the cork are so arranged that any small amount of liquid passing over this bend will be retained there; and if the amount is in the least considerable it will by the next exhalation be thrown back in the vessel Q, so that it never can pass in the tube S, and much less in the mouth of the patient.

A separate vessel, X, is provided, similar to the large gasometer H I, but much smaller. It serves as an artificial respirator by attaching the tube O to the mouth-piece T and moving the inner bell-jar, $x$, up and down in the lower vessel, containing water or some other suitable liquid. When the large gasometer H I is filled with freshly-prepared gas, the artificial respirator will cause this to pass through the liquids in the vessels P and Q, and hasten its purification.

The advantages of my invention over the old way of administering gases are, that the administration of nitrous-oxide or other gases has hitherto been accomplished in a very dangerous and disgusting way, obliging the patients to breathe the gas from india-rubber bags or even bladders, blowing the expired impure into those bags, thereby producing a continually-increasing quantity of carbonic-acid gas, and by inhaling this mixture over again, frequently causing nausea and vomiting, (the symptoms of poisoning with carbonic-acid gas.)

My apparatus, as above fully described, entirely obviates and overcomes these difficulties and imperfections in a most complete and economical manner.

In order to avoid the necessity of making the gas in small quantities for every time it is administered, a large bag or gasometer may be attached in place of the retort, in which gasometer thirty, forty, or more gallons is kept as provision; or, in place of this large bulky gasometer or bag, a small very strong metallic cylinder in which the gas is compressed at 32° Fahrenheit by a force-pump of thirty-two atmospheres, and consequently liquefied. In this way a large quantity of gas—say one thousand gallons, sufficient for the treatment of one hundred to two hundred patients—may be kept in a space of about a quarter of one cubic foot. By this last arrangement we obtain the additional advantages of making the gas perfectly pure, (as the common admixtures of air, &c., are not condensable at that pressure,) of keeping it in the perfect pure state for any length of time without possible deterioration or loss by absorption by water or endosmose of the bag, and of having the gas always cool by the act of its expansion from the liquid to the gaseous state.

What I claim as my invention, and desire to secure by Letters Patent, is—

1. The construction of the apparatus described for the generation, preservation, but particularly for the administration, of anæsthetic gaseous substances, so that the injurious products of the respiration are absorbed by the passage of the expired gas by a separate channel through an appropriate alkaline solution, and all waste of the expired gas is thus avoided.

2. A strong cylinder or globe able to withstand the pressure of at least fifty atmospheres, containing the laughing-gas condensed to its liquid form, of which a portion, by the simple partial opening of a stop-cock, expands, cools, and supplies the common breathing-bags, or, what is better, the above-described inhaling apparatus, with any desired quantity of fresh, cold, and perfectly pure nitrous-oxide gas.

New York, November 15, 1863.

P. H. VANDER WEYDE.

Witnesses:
 CHAS. P. BECKER,
 J. W. LASSERRE.